United States Patent [19]

Bennington et al.

[11] 4,432,344

[45] Feb. 21, 1984

[54] METHOD AND APPARATUS FOR SOLAR DESTRUCTION OF TOXIC AND HAZARDOUS MATERIALS

[75] Inventors: James E. Bennington, Ann Arbor, Mich.; Gerald E. Bennington, Vienna, Va.; Frederick E. Bernardin, Jr.; Donald J. Patterson, both of Ann Arbor, Mich.; Walter J. Weber, Jr., Ypsilanti, Mich.

[73] Assignee: Focus Environmental Systems, Ann Arbor, Mich.

[21] Appl. No.: 283,642

[22] Filed: Jul. 15, 1981

[51] Int. Cl.³ .................................................. F24J 3/02
[52] U.S. Cl. .................................... 126/438; 126/417; 126/452; 110/246; 110/235
[58] Field of Search ............... 126/438, 439, 451, 452, 126/417, 440; 110/235, 345, 346, 236; 210/758, 748

[56] References Cited

U.S. PATENT DOCUMENTS

| | | | |
|---|---|---|---|
| 3,951,797 | 4/1976 | Seely | 210/748 |
| 3,993,458 | 11/1976 | Antal, Jr. | 126/452 X |
| 3,998,205 | 12/1976 | Scragg et al. | 126/452 X |
| 4,008,136 | 2/1977 | Williams | 210/758 X |
| 4,229,184 | 10/1980 | Gregg | 126/438 X |
| 4,230,053 | 10/1980 | Deardorff et al. | 110/346 |
| 4,232,614 | 11/1980 | Fitch et al. | 110/235 |
| 4,241,671 | 12/1980 | Joyner et al. | 110/235 X |
| 4,265,747 | 5/1981 | Copa et al. | 210/758 |
| 4,290,779 | 9/1981 | Qader | 126/438 |
| 4,338,868 | 7/1982 | Lientz | 110/246 |

*Primary Examiner*—Larry Jones
*Attorney, Agent, or Firm*—Harness, Dickey & Pierce

[57] ABSTRACT

Toxic and hazardous organic materials are photochemically and thermally changed into innocuous and environmentally acceptable products through the proper application of solar energy. The present invention is especially well-suited for the destruction of polychlorinated biphenyls (PCB's) which are resistant to conventional incineration. The method and apparatus described herein are also capable of handling liquids, solids or vapors, with only minor operating modifications.

11 Claims, 2 Drawing Figures

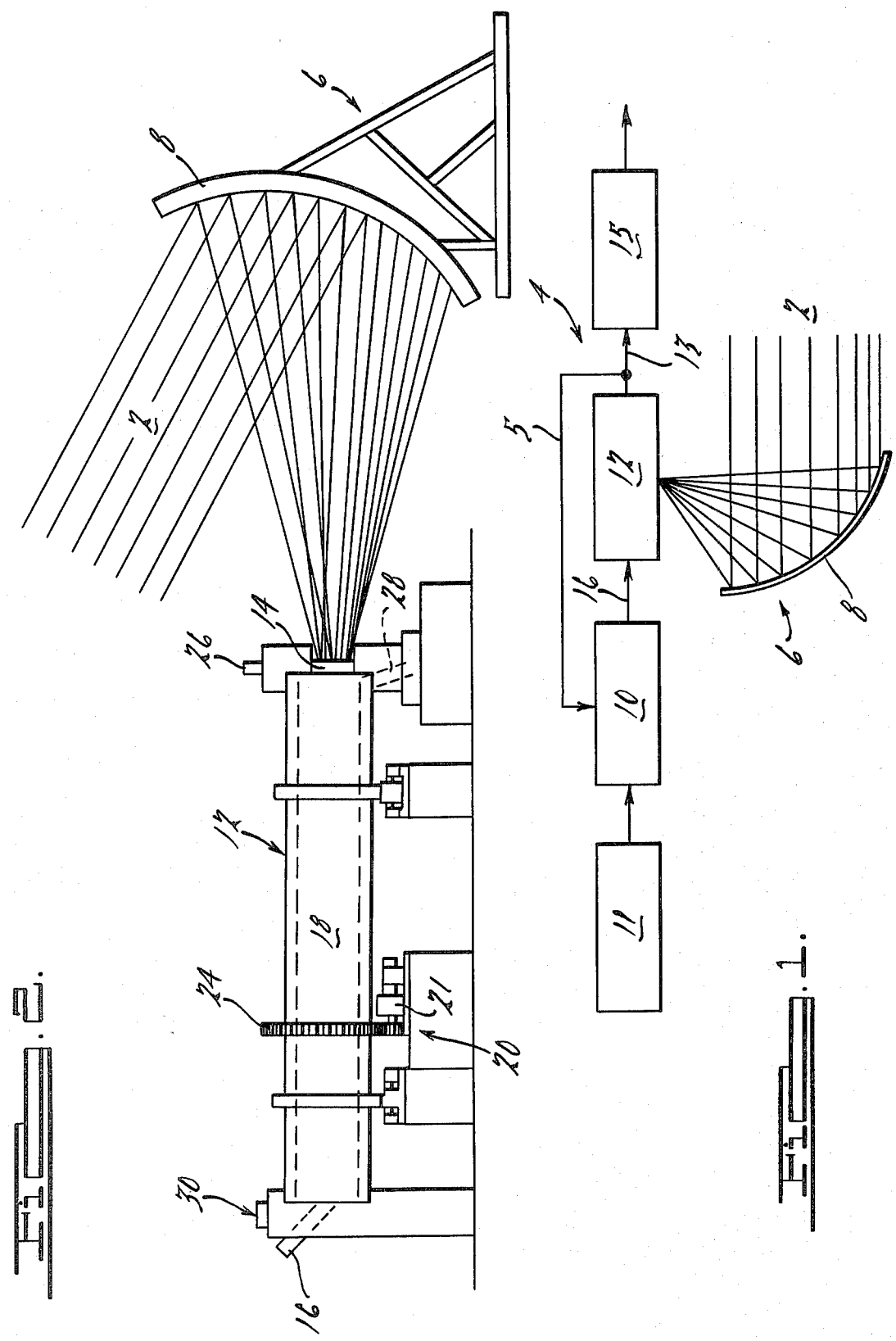

METHOD AND APPARATUS FOR SOLAR DESTRUCTION OF TOXIC AND HAZARDOUS MATERIALS

BACKGROUND AND SUMMARY OF THE INVENTION

In the great burst of technology since the 1940's, many hundreds of thousands of useful chemical compounds have been synthesized and produced by industry. Advances in the fields of analytical chemistry and medicine which followed have shown that many of these chemicals can have potential toxic and carcinogenic effects in man and that many of these are present and persistent throughout our environment. One class of chemicals which represent a particularly troublesome problem are those which are resistant or refractory to natural decomposition. Polychlorinated biphenyls (PCB's) are a notorious example of such compounds. These materials, particularly resistant to decomposition even under elevated temperature, were produced and widely used between 1929 and 1977 in many products. In pure or very concentrated form, PCB's were used as dielectric fluids in electrical transformers and as such, are still in place. Congress banned further PCB production in 1977 after animal tests indicated that PCB's could cause cancer and other health problems. It has been estemated that 750 million pounds of PCB's alone are still in use or present in some form in the United States today, with many more times that level of other potentially harmful organic compounds.

In many cases due to a lack of adequate processes or equipment, the only acceptable "disposal" method for such chemicals was long-term storage or containment underground. This method is not an adequate ultimate disposal technique and has potential for adverse effects on both man and his enviroment.

Incineration is a potentially valuable method of disposal of toxic organic materials since it is possible in theory to oxidize the compounds to $CO_2$, $H_2O$, $SO_2$, $NO_2$, and other innocuous or easily handled materials. Operational problems, the use of fossil fuels, the necessity of high volumes of gas flow, and, perhaps most important, the resistance of some compounds—particularly PCB's—to oxidation under conventional operating conditions have limited the use of incineration as a disposal method.

Chemical reaction of toxic materials to render them harmless is a method of some value in detoxification. It has long been the method of choice for many inorganic materials, such as metals and cyanides, and has obvious potential for use in organic treatment. Chemical methods suffer, however, from high cost requirements for close control of processes and the potential for unexpected byproducts.

The present invention is characterized by a solar collector concentrating and focusing the sun's energy into a reaction vessel which is capable of containing and mixing solids, liquids, or gases and exposing these materials to the solar energy for a time sufficient to accomplish breakdown of chemical bonds. The hazardous and toxic wastes or the decomposition products can then be further reacted with, for example, oxygen, to complete the destruction process. Thus, a principal object of the present invention is to provide a method for destruction of hazardous and toxic materials through the application of concentrated solar energy.

A further object of this invention is to use the high intensity specific wavelength energy present in concentrated sunlight to break chemical bonds and accelerate decomposition of chemical compounds. The present invention also has the object using the intense thermal energy present in sunlight to obtain temperatures in excess of those created by combustion systems, which temperatures rapidly decompose chemical compounds. Still another object of this invention is to obtain these high temperatures but also minimize the requirement for air or other gaseous throughput so as to also minimize the large volumes of exit gas common to combustion systems. The present invention also has the object of providing the above objects in the treatment of solid, liquid or gaseous materials.

Photochemical degradation appears to be a primary pathway for natural environmental renewal. Specific wavelength energy can be absorbed by certain chemical bonds to break these bonds. For a given compound, the change in concentration of the organic material over time has been found to be directly proportional to the original concentration, so that a rate constant can be determined to provide an equation. That rate constant has been found to be directly proportional to the intensity of the sunlight applied to the concentration of organic material. Therefore, the rate of destruction of the compound is proportional to the intensity of the sunlight.

The present invention provides means for contacting a compound such as an organic material with sunlight which is concentrated many thousands of times.

The chemical reaction for destruction of an organic compound may be accelerated by addition of heat. Specifically, the rate constant for a chemical reaction increases in an exponential manner with temperature. For many common reactions, the effect of this relationship is that reaction rates can be double or triple with a temperature increase of 10 degrees Centigrade.

The present invention provides means for heating the reaction vessel containing a compound such as an organic material and permits doing so without an external combustion process or other man-made energy source which may add materials which in turn would have to be safely exhausted. The present invention may, as an alternative, be used to supplement a man-made energy source.

Other objects and advantages of the instant invention will be apparent in the following specification, claims and drawings.

BRIEF DESCRIPTION OF THE DRAWINGS

FIG. 1 is a schematic view of a complete system for destruction of toxic and hazardous wastes as included in the present invention; and FIG. 2 is an elevated view of a reactor apparatus of the present invention.

DETAILED DESCRIPTION OF THE PREFERRED EMBODIMENTS

FIG. 1 illustrates a complete system 4 in which a portion of the exhaust gas from a solar reactor 12 is conducted via a conduit 5 to preheat the incoming material via a preheat mechanism 10 illustrated schematically. The preheat mechanism 10 would be located in a position before a feed port 16 of the reactor 12, with a feed mechanism 11 disposing hazardous or toxic materials into the preheat mechanism 10. The feed mechanism 11 may also provide the function of collection and concentration of hazardous or toxic materials prior to feeding the materials to the preheat mechanism 10. The remaining portion of the exhaust gas and/or ash is conveyed to treatment facilities 15 by conduit 13 where conventional vapor/solid phase treatment technology is employed to prevent possible contamination of the environment by particulate or residual compounds, releasing safe byproducts indirectly or directly to the environment and returning toxic or hazardous byproducts to a storage area and/or to the feed mechanism 11 or to an additional process.

Solar radiation in the form of sun rays 2 is collected, reflected and focused by a solar concentrator 6, consisting of at least one curved mirror 8 and a suitable tracking system necessary for effective operation. As illustrated, collected solar radiation is focused to a specific working point or area in the reactor 12. The reactor 12, however, can be mounted at the focal points of a single concentrator or may be used with a field of heliostats and several curved mirrors 8. The reactor 12 may be one reactor vessel or a series of reactor vessels, as desired, with an individual focal working point in each vessel. Each vessel may also have its own solar concentrator 6 or a solar concentrator 6 may be adjusted to focus seriatim on individual vessels.

As an alternative embodiment of the present invention, exit gas from the solar reactor 12 can be used to vaporize organic material from the sample to be treated. Vapors are then conducted to the solar reactor 12 where they are contacted with the concentrated solar energy and reacted to produce innocuous products.

The raw material for this process may be in the form of a solid, liquid or gas. Solids and liquids will require some pretreatment for volatilization, while gases may be fed directly into the solar reactor 12. Solids and liquids may be pure or may contain only a small amount of the contaminant to be reacted. Further, the process may be used to treat materials collected previously such as, for example, those materials adsorbed on activated carbon which can be removed by heat from the activated carbon.

Referring now to FIG. 2, an apparatus is illustrated that can be employed as the solar reactor 12 of the system 4 for solar destruction of toxic and hazardous wastes. Collected solar radiation is focused to a specific working point or area in the solar reactor 12 through access means comprising a suitable window 14. The material of which the window 14 is constructed is such that the material will not filter out the specific wavelength radiation necessary for the desired photochemical reactions. One such material for the window 14 is quartz. Other materials can be used based on specific radiation energy desired in the reactor 12. The window 14 is also constructed so that the window 14 may be changed to a window of a different material in order to vary the wavelengths filtered by the window 14 as desired for different compounds of pollutants or toxic materials.

The reactor 12 may be a type of rotating kiln as shown or other device embodying similar features capable of feeding the materials to a point at which focused solar energy may act upon the materials. Solids, liquids or vapor feed material is fed to the reactor 12 at the feed port 16 to enter an insulated working chamber 18 which may contain flights or blades to provide mixing of the feed material, and may be aided by a gravity feed by means of a slight angulation of the reactor 12. In the illustrated embodiment, rotation of the reactor 12 is provided by a drive mechanism 20, including a motor 21, drive pinion 22 and ring gear 24. Feed material proceeds the length of the reactor 12 toward and through the source of the concentrated solar radiation prior to exiting the reactor 12 at the exhausting means for the effluents and byproducts, discharged as a vapor at vapor discharge port 26 or an ash or other solid at the lower gravity discharge port 28. If desired, reaction gas may be added to the reactor 12 through port 30 to facilitate the waste destruction process, the residual of which reaction gas will also be exhausted at discharge port 26.

While the above description constitutes the preferred embodiments of the present invention, it will be appreciated that the invention is susceptible to modification, variation and change without departing from the proper scope or fair meaning of the accompanying claims.

What is claimed is:

1. In a system including a working chamber, a method for destruction of toxic and hazardous materials, comprising:

feeding said materials into a working chamber;

collecting and filtering solar energy and focusing said filtered solar energy into said working chamber to directly act upon said materials in said working chamber; and exhausting the byproducts of said materials out of said working chamber while minimizing any need for any large volumes of gaseous throughput through said working chamber.

2. A method in accordance with claim 1, further comprising the step of preheating said materials prior to feeding said materials into said working chamber.

3. A method in accordance with claim 1, further comprising the steps of monitoring said byproducts as the byproducts are exhausted from said working chamber, releasing the safe byproducts from the system and directing toxic or hazardous byproducts to a safe storage area.

4. An apparatus for the destruction of toxic and hazardous materials, said materials having specific chemical bonding energies, comprising:

a reactor comprising a reaction chamber, including means for withdrawing material from said chamber and having a reaction zone within said chamber;

a transparent window set in one surface of said reactor, said window being transparent to solar radiation at the wanelengths corresponding to the bonding energies of said materials;

means for collecting solar radiation, directing solar radiation into said reaction chamber through said transparent window, concentrating said solar radiation to within said reaction zone, and focusing solar energy in said zone; and means for feeding toxic or hazardous materials primarily by gravity into the interior of said reactor at said reactor zone;

wherein the high intensity specific wavelength energy present in said concentrated sunlight breaks chemical bonds in said toxic or hazardous materials and accelerates decomposition of the chemical compounds of said toxic or hazardous materials, degrading said compounds in direct proportion to the original concentration of the compounds.

5. A claim in accordance with claim 4, wherein said window is composed of a quartz material.

6. A claim in accordance with claim 4, further comprising a rotating reactor which includes said working chamber and has said solar energy access means disposed substantially at one end of said reactor and said feeding means disposed substantially at the opposite end of said reactor.

7. A claim in accordance with calim 4, further comprising a rotating reactor rotating about an axis, which has said feeding means disposed substantially at one axial end of said reactor and said exhausting means disposed substantially at the other axial end of said reactor.

8. A claim in accordance with claim 4, wherein said means for exhausting includes monitoring means for determining whether said byproducts are safe or hazardous, means for returning hazardous byproducts to said feeding means, and means for exhausting safe byproducts to the environment.

9. A claim in accordance with claim 4, further comprising means for preheating said hazardous or toxic materials disposed between said feeding means for conducting exhausted materials through said preheating means wherein the residual heat from said exhausted materials is used to preheat hazardous or toxic materials fed into said working chamber.

10. An apparatus as set forth in claim 4, wherein said window is removable and replaceable with a different window of a different transparency to vary the wavelengths filtered by the window as desired for different compounds of toxic materials.

11. An apparatus as set forth in claim 4, wherein said reactor includes means for minimizing the need for gaseous throughput during the use of said apparatus in said destruction of toxic and hazardous materials.

* * * * *

UNITED STATES PATENT AND TRADEMARK OFFICE
CERTIFICATE OF CORRECTION

PATENT NO. : 4,432,344

DATED : February 21, 1984

INVENTOR(S) : James E. Bennington, et al

It is certified that error appears in the above-identified patent and that said Letters Patent is hereby corrected as shown below:

Abstract, line 7, After "incineration" insert --.--.

Column 1, line 38, "enviroment" should be --environment--.

Column 4, line 47, "wanelengths" should be --wavelengths--.

Column 5, line 4, "calim" should be --Claim--.

Signed and Sealed this

Twenty-second Day of May 1984

[SEAL]

Attest:

GERALD J. MOSSINGHOFF

Attesting Officer

Commissioner of Patents and Trademarks